US012649364B2

(12) United States Patent
Tsuda et al.

(10) Patent No.: US 12,649,364 B2
(45) Date of Patent: Jun. 9, 2026

(54) DISPLAY CONTROL DEVICE

(71) Applicant: TOYOTA JIDOSHA KABUSHIKI KAISHA, Toyota (JP)

(72) Inventors: Hideki Tsuda, Nagoya (JP); Go Matsunobu, Okazaki (JP); Kazuhisa Ishimaru, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/938,793

(22) Filed: Nov. 6, 2024

(65) Prior Publication Data

US 2025/0206140 A1      Jun. 26, 2025

(30) Foreign Application Priority Data

Dec. 21, 2023      (JP) ................................. 2023-216260

(51) Int. Cl.
B60K 35/81          (2024.01)
B60K 35/233        (2024.01)
B60K 35/28          (2024.01)

(52) U.S. Cl.
CPC ............ B60K 35/81 (2024.01); B60K 35/233 (2024.01); B60K 35/28 (2024.01); *B60K 2360/177* (2024.01); *B60K 2360/179* (2024.01); *B60K 2360/334* (2024.01)

(58) Field of Classification Search
CPC ...... B60K 35/81; B60K 35/233; B60K 35/28; B60K 2360/177; B60K 2360/179; B60K 2360/334
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |

(Continued)

FOREIGN PATENT DOCUMENTS

JP          6536855 B2      7/2019

*Primary Examiner* — Nay Tun
(74) *Attorney, Agent, or Firm* — Finnegan, Henderson, Farabow, Garrett and Dunner, LLP

(57) ABSTRACT

A display ECU is configured to detect, from an image acquired by a camera, a vehicle to be followed that precedes a host vehicle, project a marker image, in the screen display frame, with any one of a display near the vehicle to be followed and a display on the vehicle to be followed in a superimposed manner, and control the AR-HUD such that the marker image exhibits, when the entire vehicle to be followed is in the screen display frame, a first shape in which the marker image is displayed at maximum size, and the marker image exhibits, when the vehicle to be followed deviates from the screen display frame, a second shape in which the marker image deforms in a state of being in contact with the screen display frame according to a position of the vehicle to be followed present outside the screen display frame.

5 Claims, 6 Drawing Sheets

(56) References Cited

U.S. PATENT DOCUMENTS

| | | | |
|---|---|---|---|
| 2006/0215020 A1* | 9/2006 | Mori | B60R 1/27 |
| | | | 348/148 |
| 2016/0152184 A1* | 6/2016 | Ogawa | B60K 35/233 |
| | | | 345/589 |
| 2018/0023970 A1* | 1/2018 | Iguchi | G09G 5/00 |
| | | | 345/7 |
| 2018/0240258 A1* | 8/2018 | Kosaka | B60W 30/165 |
| 2019/0295419 A1 | 9/2019 | Tosa et al. | |
| 2020/0166746 A1* | 5/2020 | Green | B60W 30/095 |
| 2020/0198660 A1* | 6/2020 | Bellet | B60R 1/24 |
| 2020/0258480 A1* | 8/2020 | Bronder | B60K 35/29 |
| 2023/0022485 A1* | 1/2023 | Fujita | B60K 35/234 |
| 2023/0191911 A1* | 6/2023 | Izumi | B60W 60/00 |
| | | | 701/36 |

* cited by examiner 84A      84B

84C 86A      86B

86C 88A      88B

88C 90A      90B

90C

DISPLAY CONTROL DEVICE

CROSS-REFERENCE TO RELATED APPLICATION

This application claims priority to Japanese Patent Application No. 2023-216260 filed on Dec. 21, 2023. The disclosure of the above-identified application, including the specification, drawings, and claims, is incorporated by reference herein in its entirety.

BACKGROUND

1. Technical Field

The disclosure relates to a display control device for an augmented reality head-up display (AR-HUD).

2. Description of Related Art

An AR-HUD for displaying information such as a marker image on a vehicle's windshield in accordance with a preceding vehicle has been used. However, since the AR-HUD displays the information solely in a limited area of the windshield, there is a problem that when the preceding vehicle moves out of the display area, the information such as the marker image is no longer displayed.

Japanese Patent No. 6536855 (JP 6536855 B) describes a disclosure in which a driver can easily recognize that control of following the preceding vehicle is activated even when a position of the preceding vehicle moves outside the display area.

SUMMARY

However, in the disclosure described in JP 6536855 B, when the position of the preceding vehicle moves outside the display area, a design of the marker image is changed and the marker image is continuously displayed in a screen display frame, which is a surrounding portion of the display area. However, determination is difficult to be made whether the change in the design of the marker image is due to the position of the preceding vehicle moving outside the display area or another factor.

The disclosure has been made in consideration of the above-described problems, and the disclosure provides a display control device capable of causing a driver to intuitively recognize that a preceding vehicle is outside a range of a display area.

A first aspect of the disclosure relates to a display control device including a controller, and an acquisition unit. The controller is configured to control an information display unit that projects and displays information in a screen display frame, which is a predetermined range of a windshield of a vehicle. The acquisition unit is configured to acquire an image of a front of the vehicle captured by an imaging unit. The controller is configured to detect, from the image acquired by the acquisition unit, a vehicle to be followed that precedes the vehicle, project a marker image for causing the vehicle to be followed positioned in the screen display frame to be recognized, in the screen display frame, with any one of a display near the vehicle to be followed and a display on the vehicle to be followed in a superimposed manner, and control the information display unit such that the marker image exhibits, when the entire vehicle to be followed is in the screen display frame, a first shape in which the marker image is displayed at maximum size, and the marker image exhibits, when the vehicle to be followed deviates from the screen display frame, a second shape in which the marker image deforms in a state of being in contact with the screen display frame according to a position of the vehicle to be followed present outside the screen display frame.

With the display control device according to the first aspect, when the vehicle to be followed, which is the preceding vehicle, deviates from the screen display frame, with the deformation of the marker image according to the position of the vehicle to be followed present outside the screen display frame, the driver can intuitively recognize that the preceding vehicle is outside a range of the screen display frame, which is a display area.

In the display control device according to a second aspect of the present disclosure, the second shape may be deformed to be shorter in a vehicle width direction of the vehicle to be followed from an end portion in contact with the screen display frame while the second shape maintains a shape of the end portion present in the screen display frame.

With the display control device according to the second aspect, since design continuity is maintained between the first shape and the second shape with the deformation of the marker image to be shorter in the vehicle width direction of the vehicle to be followed from the end portion in contact with the screen display frame, the driver can intuitively recognize that the preceding vehicle deviates from the display area to the outside of the display area.

In the display control device according to a third aspect of the present disclosure, the end portion of the marker image in contact with the screen display frame may be expressed to be cut off in an animation, during the deformation.

With the display control device according to the third aspect, the driver can intuitively recognize that the preceding vehicle is outside the range of the display area with the animation display.

In the display control device according to a fourth aspect of the present disclosure, an emphasis display may be performed on four corners of the screen display frame when the marker image is deformed.

With the display control device according to the fourth aspect, the driver can intuitively recognize that the preceding vehicle is outside the range of the display area with the emphasis display of the screen display frame.

In the display control device according to a fifth aspect of the present disclosure, the controller may be configured to, when the vehicle to be followed enters the screen display frame, control the information display unit to expand the marker image of the second shape in a vehicle width direction of the vehicle to be followed to return the marker image to the first shape.

With the display control device according to the fifth aspect, the driver can recognize that the preceding vehicle has entered the screen display frame with the return of the marker image from the second shape to the first shape.

The disclosure has the effect of allowing the driver to intuitively recognize that the preceding vehicle is outside the range of the display area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
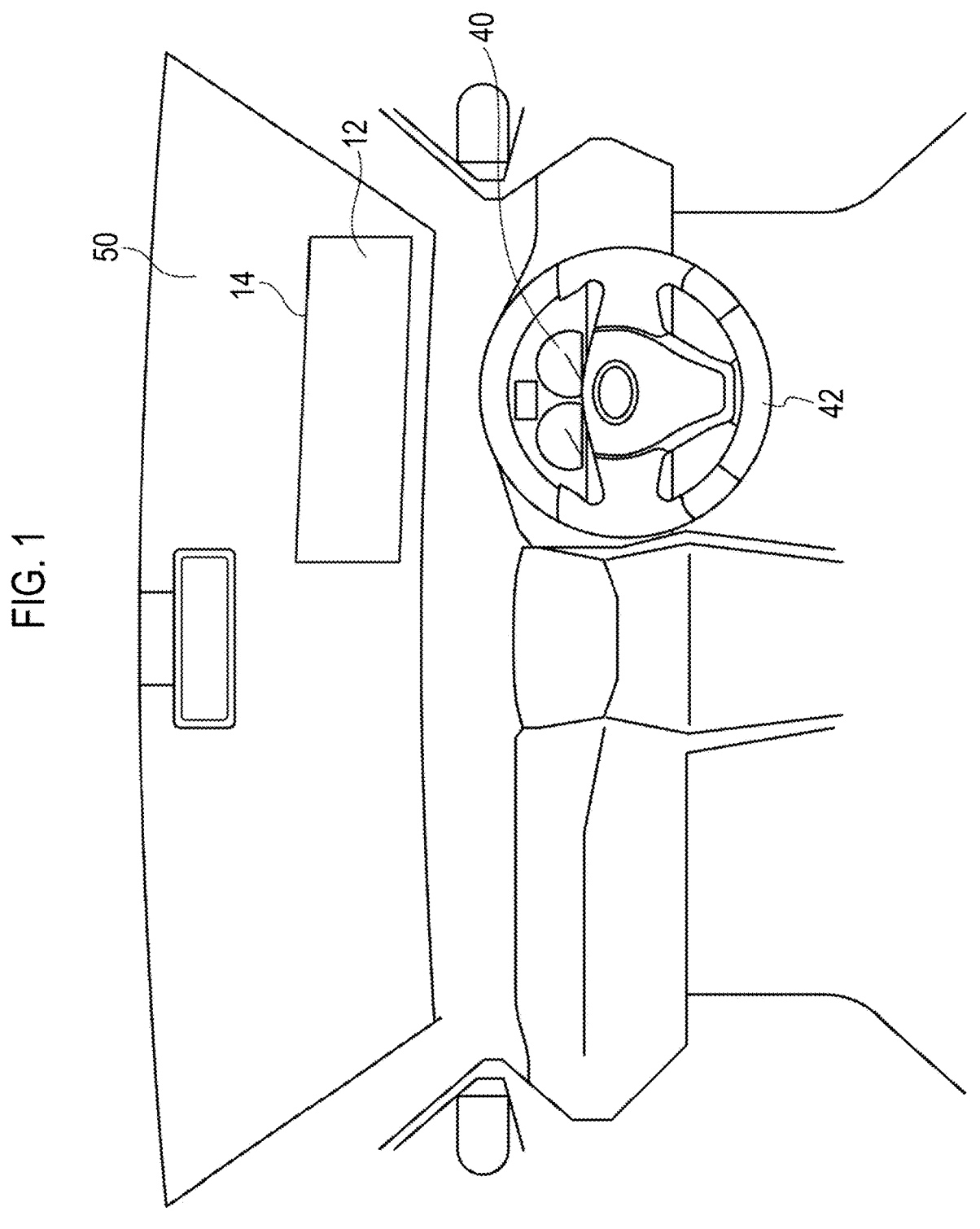
FIG. 1 is a schematic diagram showing an example of an AR-HUD in the present embodiment.

Hereinafter, an example of the present embodiment will be described in detail with reference to drawings. FIG. 1 is a schematic diagram showing an example of an AR-HUD 12 in the present embodiment. The AR-HUD 12 is provided at a position corresponding to a viewpoint of a driver on a windshield 50, separate from an instrument panel 40 provided near a steering wheel 42. As shown in FIG. 1, in the AR-HUD 12, an area on an inner side of a predetermined screen display frame 14 is a display area where information such as a marker image is displayed. The screen display frame 14 is, in principle, provided in a state of being invisible to the driver.

Figure 2:
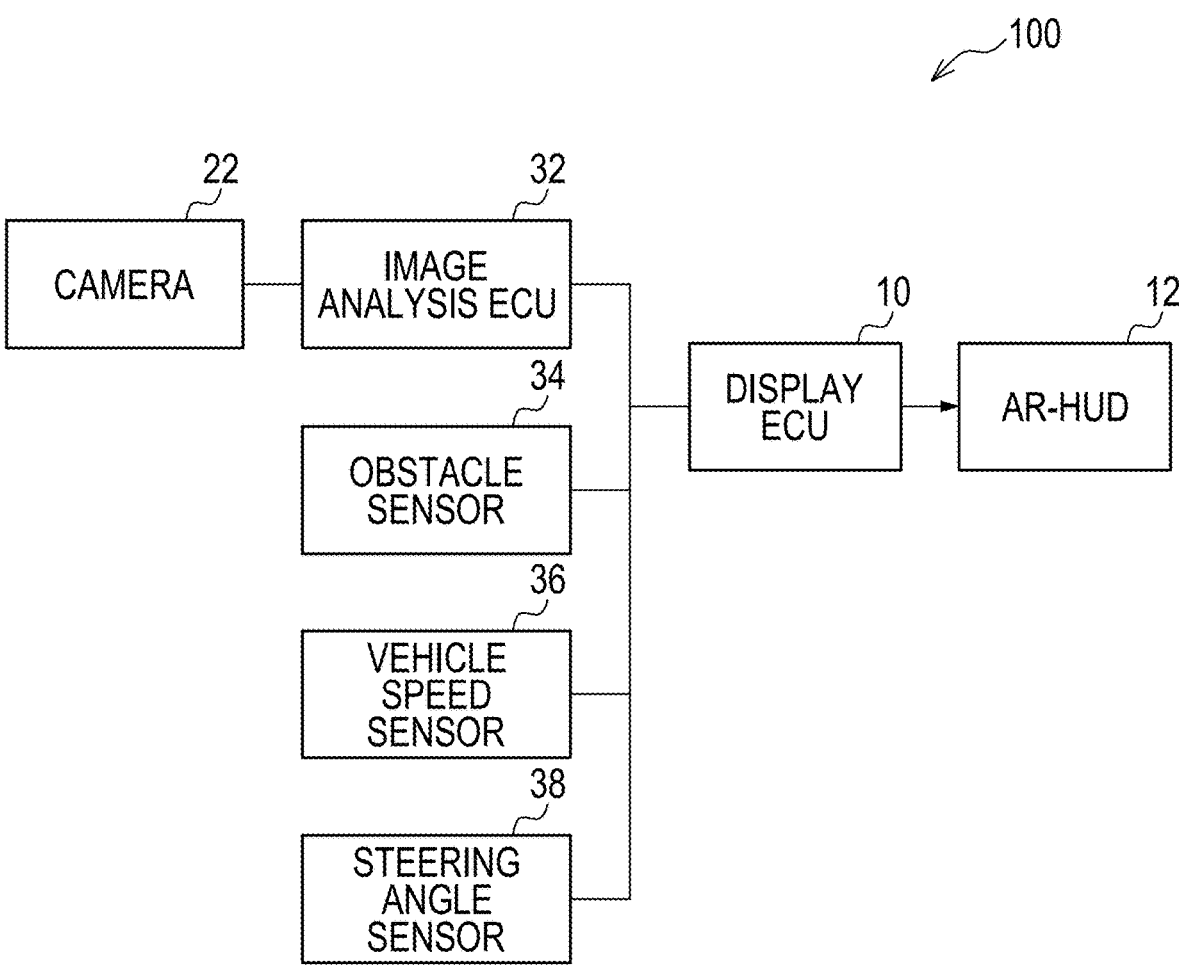
FIG. 2 is a block diagram showing an example of a configuration of a display control device according to the present embodiment.

FIG. 2 is a block diagram showing an example of a configuration of a display control device 100 according to the present embodiment. The display control device 100 according to the present embodiment includes a display electronic control unit (ECU) 10 that generates, based on information detected by various sensors, data such as the marker image or the like indicating a preceding vehicle, and the AR-HUD 12 that projects and displays, onto a windshield 50 of a vehicle, the information such as the marker image based on the data generated by the display ECU 10.

The various sensors include a camera 22 that acquires an image of a front of the vehicle, an obstacle sensor 34 that detects an obstacle or the like present around the vehicle, a vehicle speed sensor 36 that detects a speed of the vehicle, and a steering angle sensor 38 that detects a steering angle of the vehicle.

The camera 22 acquires the image of the front of the vehicle. An image analysis ECU 32 analyzes the image of the front of the vehicle, which is acquired by the camera 22, to detect the preceding vehicle as a vehicle to be followed. As an example, the image analysis ECU 32 uses a model subjected to machine learning in which a mathematical model, such as a convolutional neural network (CNN), is constructed through the machine learning using image data in which a type of the vehicle is specified in advance, as training data, to detect the vehicle in the image.

The obstacle sensor 34 is, for example, a millimeter-wave radar, a light detection and ranging (LIDAR), or a sonar. The millimeter-wave radar emits a millimeter wave to the front or a front side of the vehicle and receives a radio wave reflected from a target object to measure, based on a frequency difference or the like caused by a propagation time and a Doppler effect, a distance to an obstacle or the like, a relative speed between a host vehicle and the obstacle or the like, and the like. As an example, the LIDAR detects the obstacle or the like from scattered light of a pulse-shaped laser irradiated around the vehicle. As an example, the sonar detects the obstacle or the like by using a difference in reflectivity of ultrasonic waves irradiated around the vehicle.

Each of the image analysis ECU 32 and the display ECU 10 includes a central processing unit (CPU), which is a calculation processing device, and a storage device, and executes predetermined calculation processing based on a program stored in the storage device. The image analysis ECU 32 and the display ECU 10 each may be integrally configured. Additionally, the display ECU 10 and the AR-HUD 12 each may also be integrally configured.

In the present embodiment, an advance direction of the vehicle is estimated from a detection result of the steering angle sensor 38. However, a gyro sensor may also be provided, in addition to the steering angle sensor 38, to detect the advance direction of the vehicle.

Figure 3:
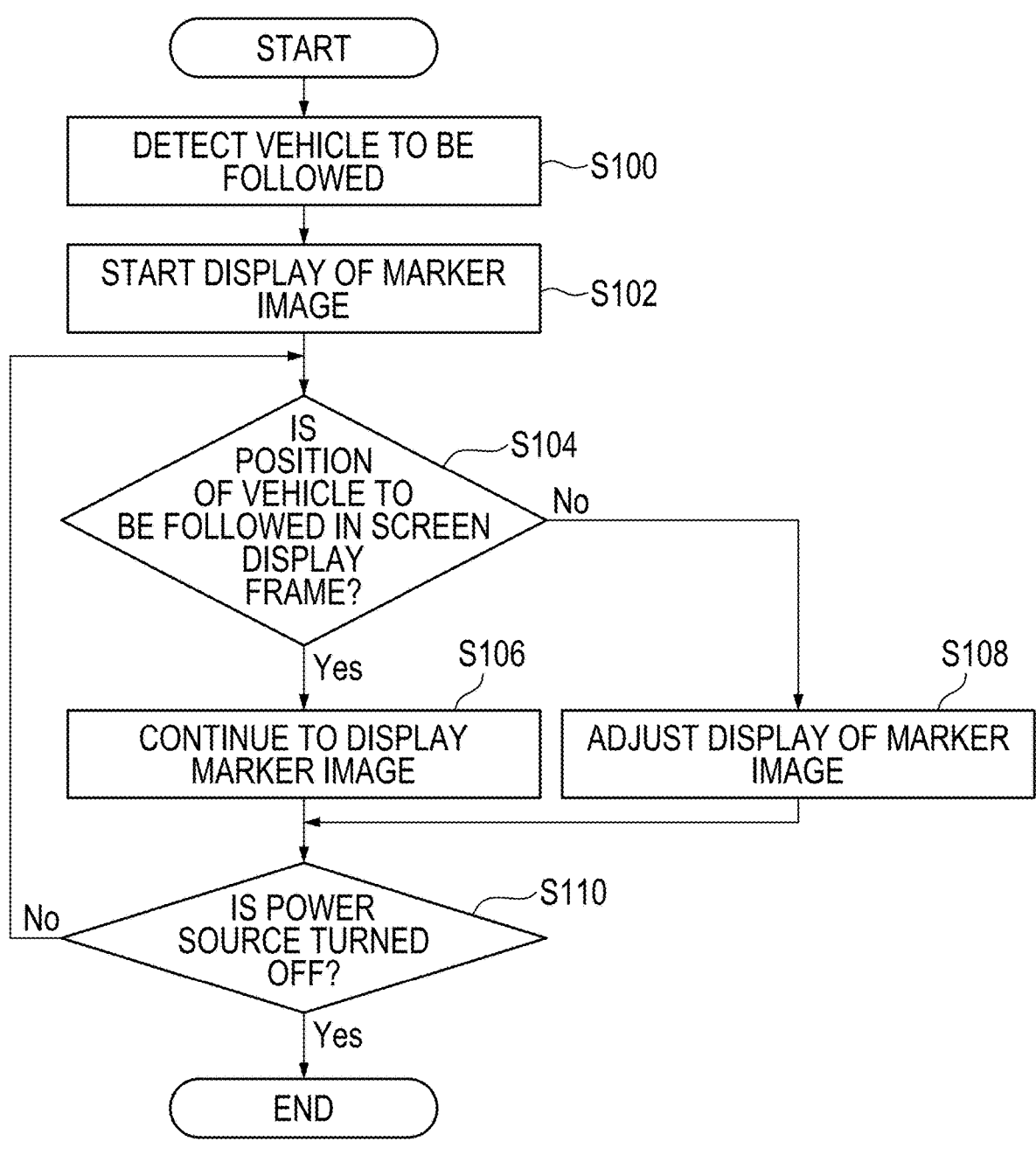
FIG. 3 is a flowchart showing an example of processing of the display control device according to the present embodiment.

FIG. 3 is a flowchart showing an example of processing performed by the display control device 100 according to the present embodiment. The processing shown in FIG. 3 is started when a power source of the vehicle is in a state of accessory (ACC) on or ignition (IG) on.

In step S100, the image analysis ECU 32 detects the preceding vehicle, which is the vehicle to be followed to which the marker image is attached in the screen display frame 14, from the image data acquired by the camera 22. The detection of the vehicle to be followed may be executed by the display ECU 10, in addition to the image analysis ECU 32, based on an image processing result from the image analysis ECU 32 and a detection result from the obstacle sensor 34.

In step S102, the display ECU 10 starts the display of the marker image. As shown in FIGS. 4A, 4B, 4C, 4D, 4E, 4F, and 4G to FIGS. 6A, 6B, 6C, 6D, 6E, 6F, and 6G, for example, the marker image is displayed near the vehicle to be followed or is displayed on the vehicle to be followed in a superimposed manner.

In step S104, determination is made whether a position of the vehicle to be followed is in the screen display frame 14. In step S104, when the position of the vehicle to be followed is in the screen display frame 14, the procedure proceeds to step S106. When the position of the vehicle to be followed is not in the screen display frame 14, the procedure proceeds to step S108.

In step S106, the display of the marker image is continued in a current state of the marker image. In step S108, the marker image is deformed to adjust the display, as will be described below.

In step S110, determination is made whether the power source of the vehicle is turned off. In step S110, when the power source of the vehicle is turned off, the processing is ended. When the power source of the vehicle is not turned off, the procedure proceeds to step S104.

Figures 4A, 4B, 4C, 4D, 4E, 4F, 4G:
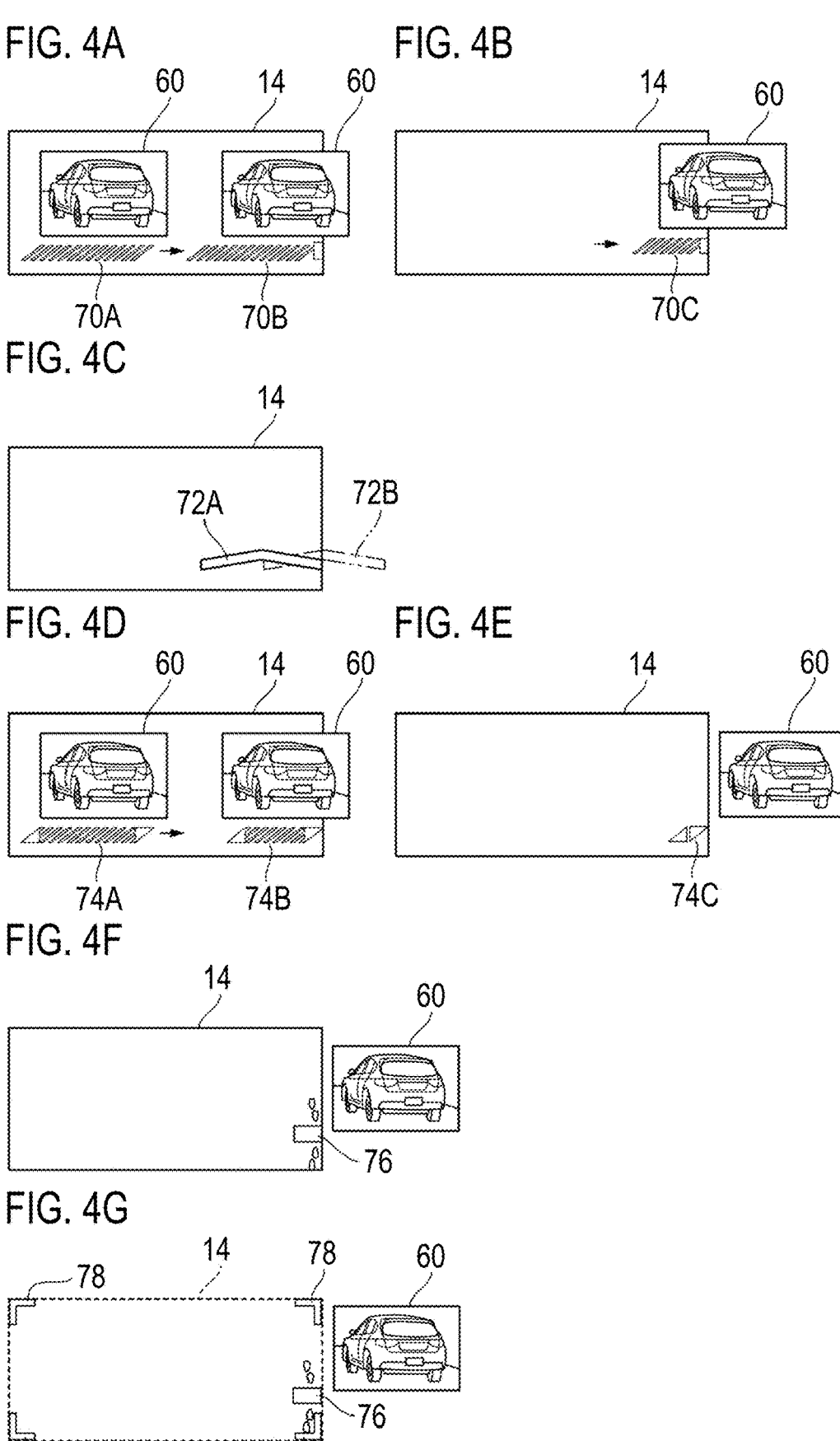
FIG. 4A is a diagram for describing a state in which a vehicle to be followed present in a screen display frame is about to deviate from the screen display frame.
FIG. 4B is a diagram for describing an example of a state in which the vehicle to be followed is deviating from the screen display frame.
FIG. 4C is a diagram for describing a case where a marker image is retained in the screen display frame when the vehicle to be followed deviates from the screen display frame.
FIG. 4D is a diagram for describing a state in which the vehicle to be followed present in the screen display frame is about to deviate from the screen display frame.
FIG. 4E is a diagram for describing an example of a state in which the vehicle to be followed completely deviates from the screen display frame.
FIG. 4F is a diagram for describing another aspect in which the marker image comes into contact with the screen display frame and an end portion of the marker image is compressed, due to the deviation of the vehicle to be followed from the screen display frame.
FIG. 4G is a diagram for describing still another aspect in which the marker image comes into contact with the screen display frame and the end portion of the marker image is compressed, due to the deviation of the vehicle to be followed from the screen display frame.

FIGS. 4A, 4B, 4C, 4D, 4E, 4F, and 4G are diagrams for describing an example of the deformation of the marker image. FIG. 4A shows a state in which a vehicle to be followed 60 present in the screen display frame 14 is about to deviate from the screen display frame 14. When the vehicle to be followed 60 is present in the screen display frame 14, a marker image 70A exhibits a first shape in which the marker image 70A is displayed in a band shape at a maximum size, for example, directly below the vehicle to be followed 60. When the position of the vehicle to be followed 60 is changed to deviate from the screen display frame 14, a marker image 70B moves following the change in the position of the vehicle to be followed 60 and exhibits a second shape in which the marker image 70B deforms to be compressed shortly in a vehicle width direction (hereinafter simply referred to as "vehicle width direction") of the vehicle to be followed 60 from an end portion where the marker image 70B comes into contact with the screen display frame 14. Since the second shape is a shortened version of the first shape, the second shape maintains design continuity with the first shape. The design continuity is also consistent in other aspects of the marker image, which will be described below.

FIG. 4B is a diagram for describing an example of a state in which the vehicle to be followed 60 is deviating from the screen display frame 14. A marker image 70C in the second shape changes a display position of the marker image 70C following the vehicle to be followed 60 that is deviating from the screen display frame 14. Additionally, the marker image 70C that comes into contact with the screen display frame 14 deforms to be compressed shortly in the vehicle width direction. However, a shape of an end portion of the marker image 70C in the screen display frame 14 is maintained. As will be described below, in the present embodiment, there are various aspects of the marker image, but the shape of the end portion of the marker image in the screen display frame 14 is consistently maintained.

FIG. 4C shows a case where a marker image 72A is retained in the screen display frame 14 when the vehicle to be followed 60 deviates from the screen display frame 14. When the vehicle to be followed 60 deviates from the screen display frame 14 as indicated by a position of a marker image 72B, the driver easily recognizes the presence of the vehicle to be followed 60 when the display is performed as the marker image 72A rather than as the marker image 72B.

FIG. 4D shows a state in which the vehicle to be followed 60 present in the screen display frame 14 is about to deviate from the screen display frame 14. When the vehicle to be followed 60 is present in the screen display frame 14, a marker image 74A is displayed in a band shape, for example, directly below the vehicle to be followed 60. When the position of the vehicle to be followed 60 is changed to deviate from the screen display frame 14, a marker image 74B moves following the change in the position of the vehicle to be followed 60. When the vehicle to be followed 60 deviates from the screen display frame 14, the marker image 74B exhibits the second shape in which the marker image 74B deforms such that an end portion of the marker image 74B comes into contact with the screen display frame 14 and the end portion is compressed shortly in the vehicle width direction according to the position of the vehicle to be followed 60 that is deviating from the screen display frame 14.

FIG. 4E is a diagram for describing an example of a state in which the vehicle to be followed 60 completely deviates from the screen display frame 14. When a marker image 74C that comes into contact with the screen display frame 14 is compressed and the vehicle to be followed 60 completely deviates from the screen display frame 14, the marker image 74C is compressed to a minimum size in the second shape and is displayed at an edge of the screen display frame 14.

FIG. 4F is a diagram for describing another aspect in which a marker image 76 comes into contact with the screen display frame 14 and an end portion of the marker image 76 is compressed, due to the deviation of the vehicle to be followed 60 from the screen display frame 14. The marker image 76 exhibits the second shape in which the marker image 76 deforms to be compressed shortly in the vehicle width direction according to the position of the vehicle to be followed 60 that is deviating from the screen display frame 14. However, when the compression is performed, a fragment-like image is displayed in an animation as the marker image 76 to perform expression such as the end portion of the marker image 76 coming into contact with the screen display frame 14 and being cut off.

FIG. 4G is a diagram for describing still another aspect in which the marker image 76 comes into contact with the screen display frame 14 and the end portion of the marker image 76 is compressed, due to the deviation of the vehicle to be followed 60 from the screen display frame 14. In FIG. 4G, when the marker image 76 exhibits the second shape in which the marker image 76 comes into contact with the screen display frame 14 and deforms to be compressed shortly in the vehicle width direction, the fragment-like image is displayed in an animation as the marker image 76 and an emphasis display 78 is performed on, for example, four corners of the screen display frame 14 in a color tone with good visibility, such as yellow. With such an emphasis display 78, the driver recognizes that the vehicle to be followed 60 is deviating from the screen display frame 14 or completely deviates from the screen display frame 14. The emphasis display 78 at the four corners of the screen display frame 14 may be performed, for example, in the cases shown in FIGS. 4B to 4E, in addition to the case where the fragment-like image is displayed in an animation, and further in cases shown in FIGS. 5A, 5B, 5C, 6A, 6B, 6C, 6D, 6E, 6F, and 6G described below.

Figures 5A, 5B, 5C:
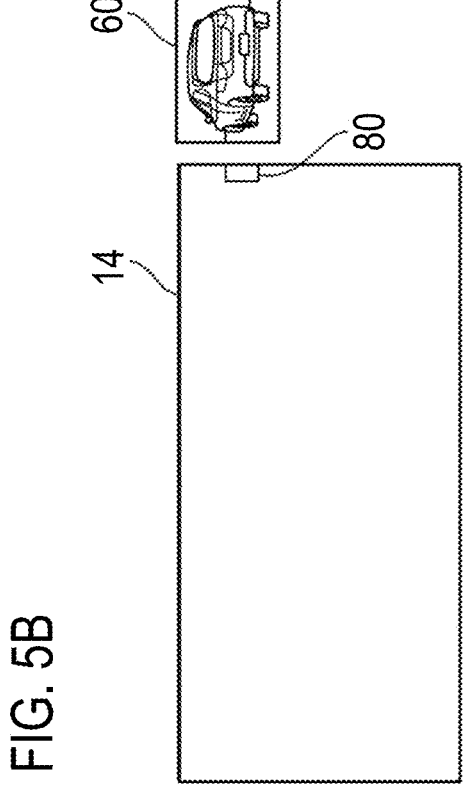
FIG. 5A is a diagram for describing a case where the vehicle to be followed completely deviates from the screen display frame and the marker image is compressed to a minimum size in a second shape.
FIG. 5B is a diagram for describing a state in which the marker image of the second shape, which is compressed on the screen display frame, moves according to a position of the vehicle to be followed present outside the screen display frame.
FIG. 5C is a diagram for describing an example of a case where the vehicle to be followed enters the screen display frame.

FIG. 5A is a diagram for describing a case where the vehicle to be followed 60 completely deviates from the screen display frame 14 and a marker image 80 is compressed to the minimum size in the second shape. The compressed marker image 80 is displayed at a position on the screen display frame 14 that is closest to a position where the vehicle to be followed 60 is present.

FIG. 5B is a diagram for describing a state in which the compressed marker image 80 of the second shape on the screen display frame 14 moves according to the position of the vehicle to be followed 60 present outside the screen display frame 14. With the movement of the compressed marker image 80 according to the change in the position of the vehicle to be followed 60, the driver recognizes the presence of the vehicle to be followed 60.

FIG. 5C is a diagram for describing an example of a case where the vehicle to be followed 60 enters the screen display frame 14. As shown in FIG. 5C, a marker image 82 expands in the vehicle width direction from the compressed state as the vehicle to be followed 60 enters the screen display frame 14, and moves according to the position of the vehicle to be followed 60 in the screen display frame 14.

Figure 6A:
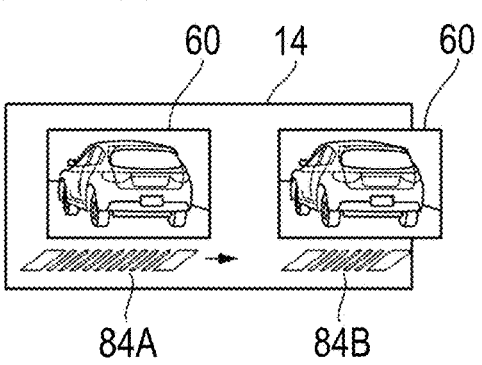
FIG. 6A is a diagram for describing a marker image exhibiting a state in which parallelogram-shaped figures are intermittently connected.

FIGS. 6A, 6B, 6C, 6D, 6E, 6F, and 6G show other aspects of the marker image. FIG. 6A shows marker images 84A, 84B exhibiting a state in which parallelogram-shaped figures are intermittently connected. The marker image 84A in the first shape moves according to the change in the position of the vehicle to be followed 60. When the position of the vehicle to be followed 60 moves outside the screen display frame 14, the marker image 84B in the second shape is compressed in a state of being in contact with the screen display frame 14.

Figure 6B:
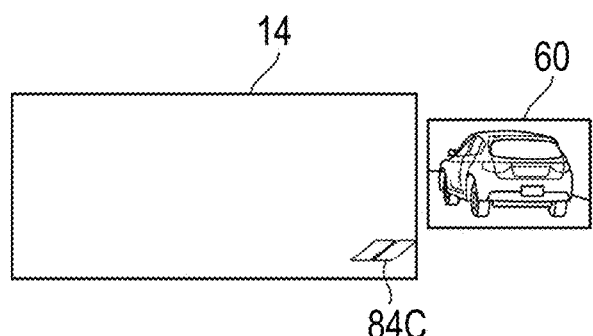
FIG. 6B is a diagram for describing a state in which the vehicle to be followed completely deviates from the screen display frame and the marker image is compressed to the minimum size as the second shape.

FIG. 6B shows a state in which the vehicle to be followed 60 completely deviates from the screen display frame 14 and a marker image 84C is compressed to the minimum size as the second shape. The marker image 84C, which is compressed to the minimum size, exhibits a small parallelogram shape.

Figure 6C:
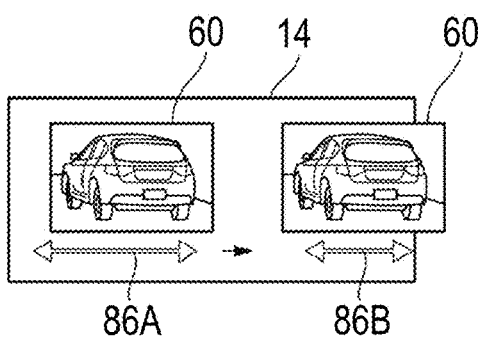
FIG. 6C is a diagram for describing a marker image exhibiting an arrow shape.

FIG. 6C shows marker images 86A, 86B exhibiting an arrow shape. The marker image 86A in the first shape moves according to the change in the position of the vehicle to be followed 60. When the position of the vehicle to be followed 60 moves outside the screen display frame 14, the marker image 86B in the second shape is compressed in a state of being in contact with the screen display frame 14.

Figure 6D:
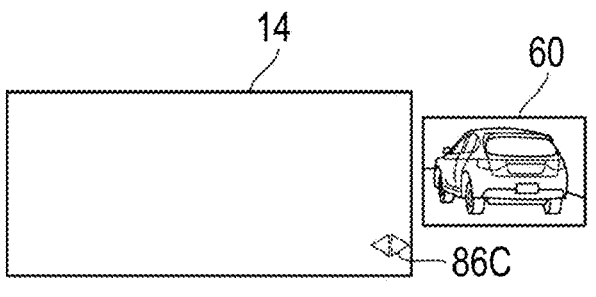
FIG. 6D is a diagram for describing a state in which the vehicle to be followed completely deviates from the screen display frame and the marker image is compressed to the minimum size as the second shape.

FIG. 6D shows a state in which the vehicle to be followed 60 completely deviates from the screen display frame 14 and a marker image 86C is compressed to the minimum size as the second shape. The marker image 86C, which is compressed to the minimum size, exhibits a diamond shape where protrusions on right and left sides of the arrow are combined.

Figure 6E:
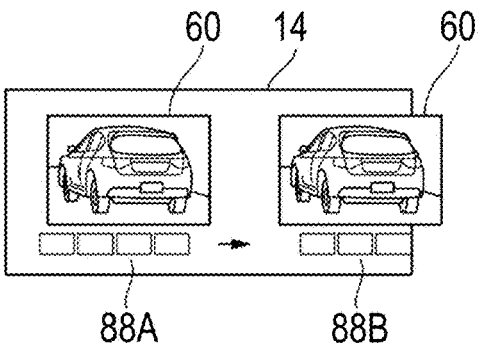
FIG. 6E is a diagram for describing a marker image exhibiting a state in which rectangular solid-shaped figures are intermittently connected.

FIG. 6E shows marker images 88A, 88B exhibiting a state in which rectangular solid-shaped figures are intermittently connected. The marker image 88A in the first shape moves according to the change in the position of the vehicle to be followed 60. When the position of the vehicle to be followed 60 moves outside the screen display frame 14, the marker image 88B is compressed in a state of being in contact with the screen display frame 14.

Figure 6F:
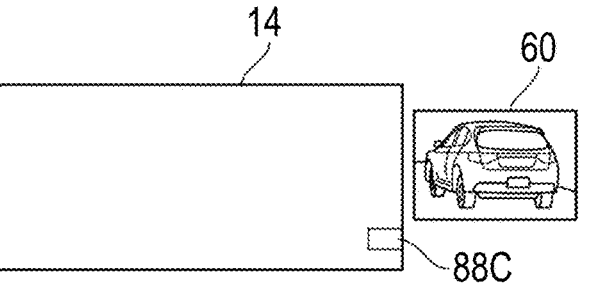
FIG. 6F is a diagram for describing a state in which the vehicle to be followed completely deviates from the screen display frame and the marker image is compressed to the minimum size as the second shape.

FIG. 6F shows a state in which the vehicle to be followed 60 completely deviates from the screen display frame 14 and a marker image 88C is compressed to the minimum size as the second shape. The marker image 88C, which is compressed to the minimum size, exhibits a small rectangular solid shape.

Figure 6G:
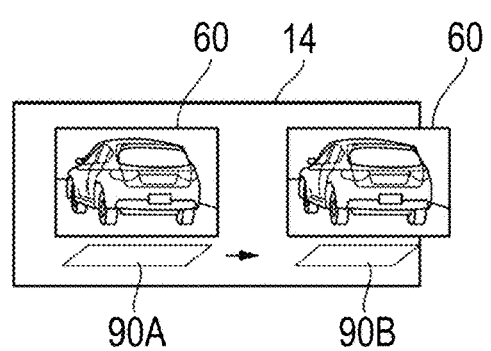
FIG. 6G is a diagram for describing a marker image exhibiting a parallelogram shape.

FIG. 6G shows marker images 90A, 90B exhibit a parallelogram shape. The marker image 90A in the first shape moves according to the change in the position of the vehicle to be followed 60. When the position of the vehicle to be followed 60 moves outside the screen display frame 14, the marker image 90B is compressed in a state of being in contact with the screen display frame 14.

Figure 6H:
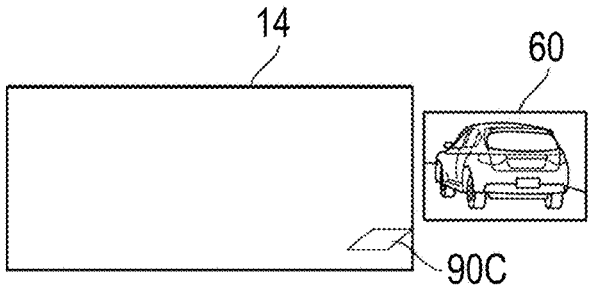
FIG. 6H is a diagram for describing a state in which the vehicle to be followed completely deviates from the screen display frame and the marker image is compressed to the minimum size as the second shape.

FIG. 6H shows a state in which the vehicle to be followed 60 completely deviates from the screen display frame 14 and a marker image 90C is compressed to the minimum size as the second shape. The marker image 90C, which is compressed to the minimum size, exhibits a small parallelogram shape.

As described above, the display control device according to the present embodiment deforms the marker image based on the screen display frame 14 and the position of the vehicle to be followed 60, which is the preceding vehicle. Specifically, when the preceding vehicle deviates from the screen display frame 14, with the deformation of the marker image according to the position of the vehicle to be followed 60 present outside the screen display frame 14, the driver can intuitively recognize that the preceding vehicle is outside a range of the display area.

The information display unit in the claims corresponds to the AR-HUD 12 in the detailed description of the disclosure in the specification. The imaging unit in the claims corresponds to the camera 22 in the detailed description of the disclosure in the specification. The controller in the claims corresponds to the display ECU 10 in the detailed description of the disclosure in the specification.

What is claimed is:

1. A display control device comprising:
a controller configured to control an information display unit that projects and displays information in a screen display frame, which is a predetermined range of a windshield of a vehicle; and
an acquisition unit configured to acquire an image of a front of the vehicle captured by an imaging unit, wherein the controller is configured to
detect, from the image acquired by the acquisition unit, a vehicle to be followed that precedes the vehicle,
project a marker image for causing the vehicle to be followed positioned in the screen display frame to be recognized, in the screen display frame, with any one of a display near the vehicle to be followed and a display on the vehicle to be followed in a superimposed manner, and
control the information display unit such that the marker image exhibits, when the entire vehicle to be followed is in the screen display frame, a first shape in which the marker image is displayed at maximum size, and the marker image exhibits, when the vehicle to be followed deviates from the screen display frame, a second shape in which the marker image deforms in a state of being in contact with the screen display frame according to a position of the vehicle to be followed present outside the screen display frame, wherein an emphasis display is performed on four corners of the screen display frame when the marker image is deformed so that a driver recognizes the vehicle to be followed is deviating from the screen display frame or completely deviates from the screen display frame.

2. The display control device according to claim 1, wherein the second shape is deformed to be shorter in a vehicle width direction of the vehicle to be followed from an end portion in contact with the screen display frame while the second shape maintains a shape of the end portion present in the screen display frame.

3. The display control device according to claim 2, wherein the end portion of the marker image in contact with the screen display frame is expressed to be cut off in an animation, during the deformation.

4. The display control device according to claim 1, wherein the controller is configured to, when the vehicle to be followed enters the screen display frame, control the information display unit to expand the marker image of the second shape in a vehicle width direction of the vehicle to be followed to return the marker image to the first shape.

5. The display control device according to claim 1, wherein the compressed marker image moves in response to a change in the position of the vehicle to be followed existing outside the screen display frame.

* * * * *